United States Patent
Sheng (10) Patent No.: US 8,756,027 B1
(45) Date of Patent: *Jun. 17, 2014

(54) REDUCING EYE MONITOR DATA SAMPLERS IN A RECEIVER

(71) Applicant: Marvell International Ltd., Hamilton (BM)

(72) Inventor: Qingyi Sheng, Fremont, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/932,726

(22) Filed: Jul. 1, 2013

Related U.S. Application Data (63) Continuation of application No. 12/699,277, filed on Feb. 3, 2010, now Pat. No. 8,478,554.

(60) Provisional application No. 61/150,995, filed on Feb. 9, 2009.

(51) Int. Cl.
| | |
|---|---|
| *G01R 29/02* | (2006.01) |
| *H04B 15/00* | (2006.01) |
| *H04B 17/00* | (2006.01) |
| *H04Q 1/20* | (2006.01) |

(52) U.S. Cl.
USPC .............. 702/79; 702/190; 375/226; 375/371

(58) Field of Classification Search
USPC ........ 702/79, 57, 89, 189, 190, 191; 327/2, 3, 327/63, 90, 50; 375/226, 227, 371
See application file for complete search history.

(56) References Cited

U.S. PATENT DOCUMENTS

| | | | |
|---|---|---|---|
| 7,092,472 B2 | 8/2006 | Stojanovic | |
| 7,778,286 B2 | 8/2010 | Agazzi et al. | |
| 8,478,554 B1 | 7/2013 | Sheng | |
| 2004/0193970 A1 | 9/2004 | Dietrich et al. | |

OTHER PUBLICATIONS

"Non-Final Office Action", U.S. Appl. No. 12/699,277, Aug. 31, 2012, 11 pages.

"Notice of Allowance", U.S. Appl. No. 12/699,277, Mar. 5, 2013, 7 pages.

*Primary Examiner* — Sujoy Kundu
*Assistant Examiner* — Ricky Ngon (57) ABSTRACT

The present specification describes techniques and apparatus for reducing eye monitor data samplers in a receiver. A single eye monitor data sampler is used for multiple normal data samplers in a receiver.

20 Claims, 8 Drawing Sheets

REDUCING EYE MONITOR DATA SAMPLERS IN A RECEIVER

RELATED APPLICATIONS

This application is a continuation of and claims priority to U.S. Utility patent application Ser. No. 12/699,277, filed on Feb. 3, 2010 which in turn claims priority under 35 U.S.C. §119(e) to U.S. Provisional Patent Application Ser. No. 61/150,995, filed on Feb. 9, 2009, the disclosure of which is hereby incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In many signal receiving systems it is desirable to monitor the data sampling for received signals. Such monitoring can be used to detect the ability of a signal receiving system to accurately sample data despite changes in the received signals or sampling process. However, such monitoring is not without its problems due to the physical space required for a mechanism that implements the monitoring as well as the additional load imposed on the data input line by the mechanism that implements the monitoring.

SUMMARY

This Summary is provided to introduce subject matter that is further described below in the Detailed Description. Accordingly, the Summary should not be considered to describe essential features nor used to limit the scope of the claimed subject matter.

A method is described that includes detecting, using a first normal data sampler, a first value received as a first portion of a signal on a data input line, and detecting, using a second normal data sampler, a second value received as a second portion of the signal on the data input line. The method further includes modifying a phase/DC offset for the first or second portion of the signal, and using an eye monitor data sampler to detect a third value from the first or second portion of the signal. The method also includes comparing the first value and the third value, outputting an indication of whether the first value matches the third value, comparing the second value and the third value, and outputting an indication of whether the second value matches the third value.

A system is also described. The system includes a first normal data sampler configured to receive a signal via a data input line and detect a first data value from a first portion of the signal, and a second normal data sampler configured to receive the signal via the data input line and detect a second data value from a second portion of the signal. The system further includes an eye monitor data sampler configured to detect a third data value from the first or second portion of the signal based on a phase/DC offset, and a comparator configured to compare the first data value to the third data value and output an indication of whether the first data value matches the third data value, and to compare the second data value to the third data value and output an indication of whether the second data value matches the third data value.

Another method is also described. The method includes detecting data values encoded in different portions of a signal using multiple normal data samplers, modifying phase/DC offsets for a single eye monitor data sampler, and detecting, using the single eye monitor data sampler, data values encoded in the different portions of the signal based on the modified phase/DC offsets. The method further includes comparing each data value detected by one of the multiple normal data samplers to a corresponding data value detected by the single eye monitor data sampler, and outputting, for each comparison, an indication of whether the data value detected by the one of the multiple normal data samplers matches the corresponding data value detected by the single eye monitor data sampler.

BRIEF DESCRIPTION OF THE DRAWINGS

The same numbers are used throughout the drawings to reference like features.

DETAILED DESCRIPTION

In a receiver, multiple normal data samplers are used to sample the signal received on a data input line. Additionally, an eye monitor data sampler corresponds to two or more of the normal data samplers, the eye monitor data sampler being used to determine a valid eye for the normal data samplers accurately sampling data from the signal received on the data input line. The valid eye allows the tolerance of the normal data samplers to be identified, indicating an amount of DC (direct current) offset and phase offset that the normal data samplers can tolerate while still accurately sampling data encoded in the signal received on the data input line.

Figure 1:
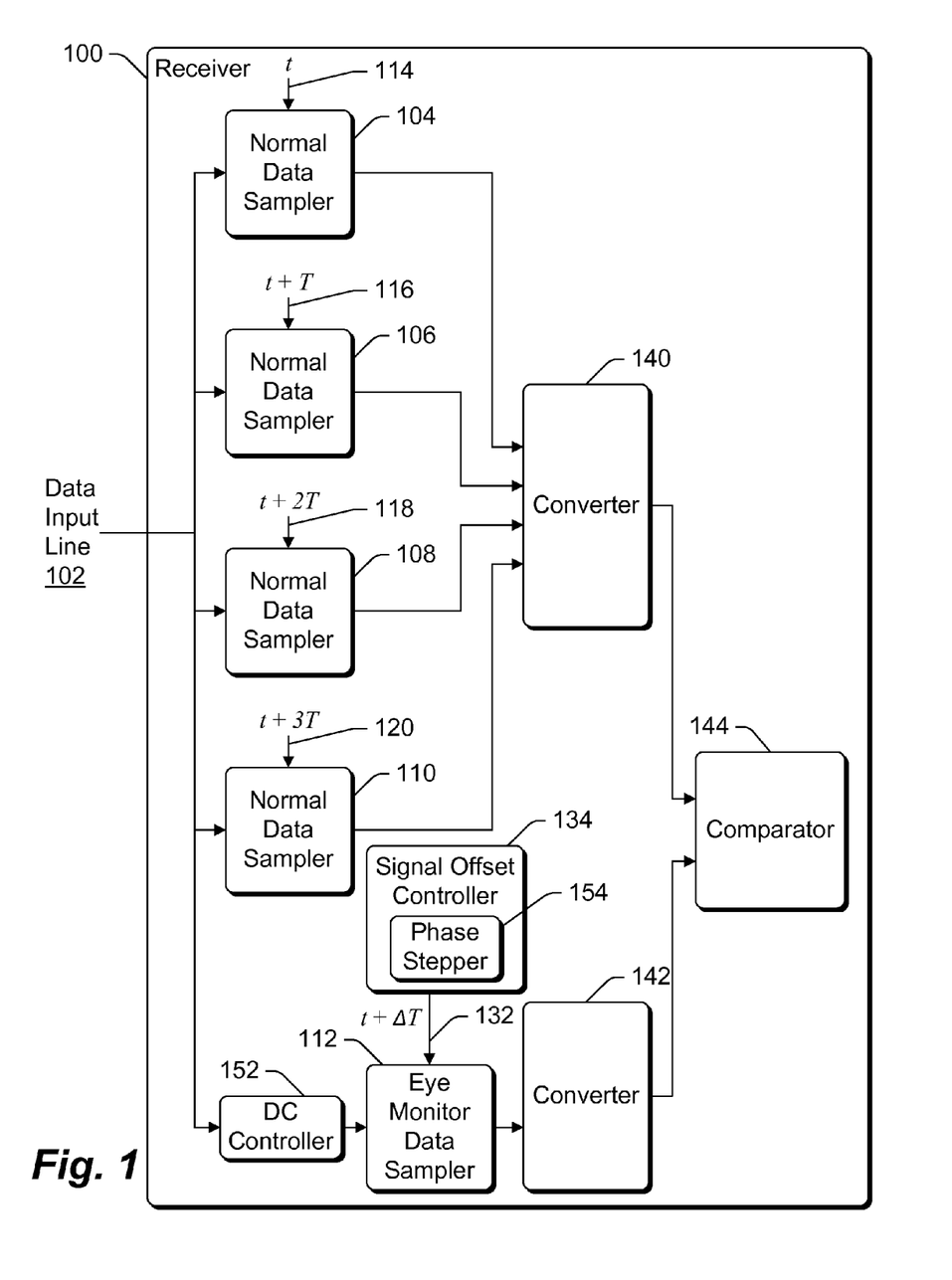
FIG. 1 is a block diagram illustrating a receiver implementing the reducing eye monitor data samplers in a receiver in accordance with one or more embodiments.

FIG. 1 is a block diagram illustrating a receiver 100 implementing the reducing eye monitor data samplers in a receiver in accordance with one or more embodiments. A data input line 102 is coupled to receiver 100 via which receiver 100 receives data encoded in analog signals. Data input line 102 can be wired and/or wireless media. For example, data input line 102 can be a five Gigabit QSGMI fiber cable.

Receiver 100 can be implemented as a single component or device, or alternatively can be implemented as part of another device. For example, receiver 100 can be implemented as a System-on-Chip (SoC). Receiver 100 can be implemented in a variety of different fixed devices or mobile devices, such as one or a combination of a media device, computer device, cellular or other wireless phone, television set-top box, video processing and/or rendering device, appliance device, gaming device, electronic device, vehicle, workstation, and/or in any other type of computing device.

The data received via data input line 102 is sampled by four samplers, although alternatively the data can be encoded in a larger or smaller number of samplers. Thus, receiver 100 includes four normal data samplers 104, 106, 108, and 110. Data samplers 104, 106, 108, and 110 are referred to as normal data samplers because they sample data on data input line 102 during the normal operation of receiver 100.

Receiver 100 also includes an eye monitor data sampler that corresponds to multiple different normal data samplers. In the illustrated example, receiver 100 includes a single eye monitor data sampler 112 that corresponds to the four normal data samplers 104, 106, 108, and 110. Eye monitor data sampler 112 is used to identify a valid eye for normal data samplers 104, 106, 108, and 110 accurately sampling data from the signal received via data input line 102. The valid eye indicates an amount of DC offset and phase offset that normal data samplers 104, 106, 108, and 110 can tolerate while still accurately detecting data encoded in the signal received via data input line 102, as discussed in more detail below.

Each data sampler 104-112 detects a data value encoded in the analog signal on data input line 102 at a particular time based on an input timing signal. The respective input timing signals are input timing signal 114 for normal data sampler 104, input timing signal 116 for normal data sampler 106, input timing signal 118 for normal data sampler 108, input timing signal 120 for normal data sampler 120, and input timing signal 132 for eye monitor data sampler 112. Individual data bits encoded in the analog signal on data input line 102 are detected by analyzing a particular portion or slice of the analog signal identified by the input timing signal for the corresponding data sampler. Based on the value of the analog signal in that particular portion or slice, a digital value of either 0 or 1 is detected by the particular normal data sampler 104-110 or eye monitor data sampler 112.

The input timing signals for the normal data samplers 104-110 identify different times at which the normal data samplers 104-110 are to detect data encoded in the analog signal on data input line 102. In the illustrated example input timing signal 114 indicates data is to be detected at time t, input timing signal 116 indicates data is to be detected at time t+T, input timing signal 118 indicates data is to be detected at time t+2T, and input timing signal 120 indicates data is to be detected at time t+3T. Each of these particular times t, t+T, t+2T, and t+3T identify a different data channel on input data line 102 via which data can be received. These input timing signals 114-120 are based on clock signal referred to as a normal clock.

The input timing signal 132 is generated by signal offset controller 134. Signal offset controller 134 controls input timing signal 132 to account for the different data channels on input data line 102. Input timing signal 132 indicates data is to be detected at time t+ΔT. Signal offset controller 134 controls the value of ΔT in order to detect data at time t, time t+T, time t+2T, and time t+3T. Thus, by controlling the value of ΔT, eye monitor data sampler 112 can detect data at the same times as each of normal data samplers 104, 106, 108, and 110. Input timing signal 132 is based on a clock signal referred to as an eye monitor clock.

Additionally, signal offset controller 134 controls input timing signal 132 to account for a phase shift. Controlling input timing signal 132 to account for a phase shift allows a valid eye to be determined that indicates an amount of phase offset that normal data samplers 104, 106, 108, and 110 can tolerate while still accurately detecting data encoded in the signal received via data input line 102, as discussed in more detail below.

Receiver 100 also includes a converter 140, a converter 142, and a comparator 144. Converter 140 converts the data sampled by normal data samplers 104-110 to a single multi-bit data value output to comparator 144. This single multi-bit data output value includes multiple bits collected from each of normal data samplers 104-110. In one or more embodiments, five bits are collected from each of normal data samplers 104-110, so the single multi-bit data output value from converter 140 is a 20-bit value. Alternatively, fewer or greater than five bits can be collected from each of normal data samplers 104-110. For example, a single bit can be collected from each of normal data samplers 104-110, so converter 140 outputs a 4-bit value to comparator 144.

Converter 142 provides the data sampled by eye monitor data sampler 112 as a single multi-bit data value output to comparator 144. Converter 142 collects five bits from eye monitor data sampler 112 and outputs the collected five bits as a single multi-bit (5-bit) data value output to comparator 144. As there is one eye monitor data sampler 112 but four normal data samplers 104-110, converter 142 stores the data sampled by eye monitor data sampler 112 and groups every fourth bit together. Once five bits have been grouped together, the five bits are output to comparator 144 as a 5-bit data value.

Comparator 144 receives the single multi-bit data output by converter 140 and the single multi-bit data value output by converter 142 and compares the two values. In one or more embodiments, converter 140 outputs a 20-bit data value and converter 142 outputs a 5-bit data value, so comparator 144 compares the 5-bit data value output by converter 142 to five bits of the 20-bit data value output by converter 140. Comparator 144 outputs an indication of whether the two values are the same. The results of this comparison can be used to identify valid eyes for normal data samplers 104-110, as discussed in more detail below.

Alternatively, converter 140 can operate as a 4-to-1 multiplexer and store data values sampled by normal data samplers 104-110. These samples collected by normal data samplers 104-110 can be grouped together to coincide with the data values output by converter 142 and then output to comparator 144. Accordingly, both converter 140 and converter 142 output 5-bit values that can be compared by comparator 144.

It is to be appreciated that although FIG. 1 is discussed with reference to four normal data samplers and one eye monitor data sampler, different quantities of normal data samplers and eye monitor data samplers can be included in a receiver. In accordance with the reducing eye monitor data samplers in a receiver discussed herein, a receiver may include multiple normal data samplers and one or more eye monitor data samplers, and at least one eye monitor data sampler corresponds to two or more of the normal data samplers.

Figure 2:
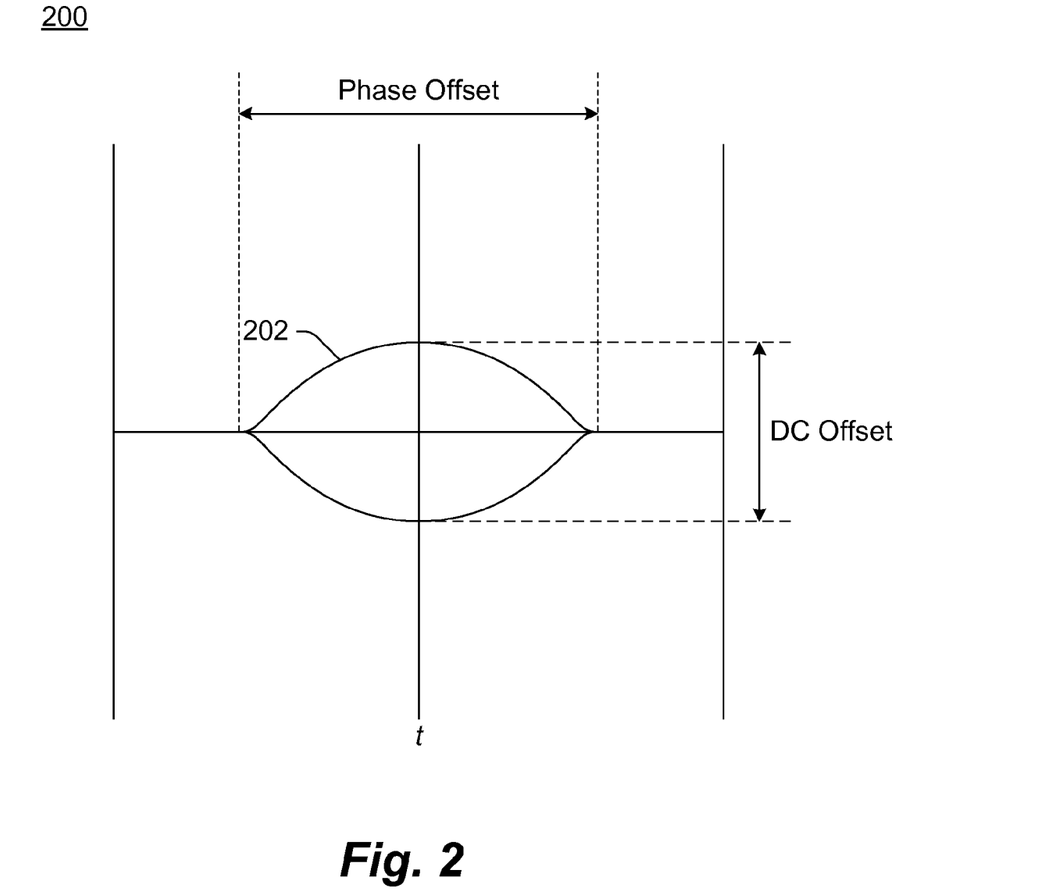
FIG. 2 is a graph illustrating a valid eye for a normal data sampler in accordance with one or more embodiments.

FIG. 2 is a graph illustrating a valid eye for a normal data sampler in accordance with one or more embodiments. In graph 200, an eye 202 is illustrated that reflects the amount of DC offset and phase offset that a normal data sampler (e.g., a normal data sampler 104-110 of FIG. 1) can tolerate while still accurately detecting data encoded in the signal received via the data input line. The DC offset is identified in the vertical direction in graph 200, and refers to the difference between an expected sampled voltage and an actual sampled voltage. For example, the normal analog input voltage is 0.25 volt, when applying a DC offset of 0.1 volt, the actual analog input to the normal data sampler is 0.35 volt. The phase offset is identified in the horizontal direction in graph 200, and refers to the difference between an expected sampling time and an actual sampling time. For example, the normal data sampler is sampling the analog signal at a time t, when applying a phase offset of 0.01 nanoseconds (ns), the actual analog input is sampled at time t+0.01 ns.

Different phase offsets and different DC offsets can be tolerated by the normal data sampler. The area within eye 202 defines the region for which the normal data sampler can accurately detect data. If, for a particular sample of the analog signal, the normal data sampler sampled the analog signal at a time having a phase offset within the eye 202 and detected a voltage within the eye 202, then the normal data sampler can accurately detect the data value encoded in the particular sample of the analog signal.

Eye 202 in graph 200 is generated based at least in part on values detected by the normal data samplers and the eye monitor data sampler. Referring to FIG. 1, signal offset controller 134 tests whether a normal data sampler 104-110 can tolerate a particular phase offset and still accurately detect the data encoded in the analog signal received via data input line 102. Signal offset controller 134 selects a phase offset amount and alters the value of $\Delta T$ by the selected phase offset amount. A check is then made based on the output of comparator 144. If comparator 144 indicates that the data value detected by signal offset controller 134 (with the value of $\Delta T$ altered by the phase offset amount) is the same as the data value output by converter 140, then the normal data sampler 104-110 that detected the data value output by converter 140 can tolerate the selected phase offset amount and still accurately detect the data encoded in the analog signal received via data input line 102. This testing can be repeated by selecting different phase offset amounts in order to generate eye 202.

Additionally, an amount of DC offset that can be tolerated by a normal data sampler 104-110 while still accurately detecting the data encoded in the analog signal received via data input line 102 is identified. The amount of DC offset that can be tolerated can be identified in different manners. In one or more embodiments, an additional DC controller 152 is included in receiver 100. DC controller 152 selects a DC offset amount and alters the value of the input analog signal to the eye monitor data sampler 112 by the selected DC offset amount. A check is then made based on the output of comparator 144. If comparator 144 indicates that the data value detected by the eye monitor data sampler 112 (with the DC offset altered by DC controller 152) and output by converter 142 is the same as the data value output by converter 140, then the normal data sampler 104-110 that detected the data value output by converter 140 can tolerate the selected DC offset amount and still accurately detect the data encoded in the analog signal received via data input line 102. This testing can be repeated by selecting different DC offset amounts in order to generate eye 202.

In one or more embodiments, signal offset controller 134 includes a phase stepper 154 to enforce small changes in the value of $\Delta T$ between clock cycles. If the selected phase offset meets a threshold amount (e.g., is greater than or equal to a threshold amount), then phase stepper 154 makes multiple changes in the value of $\Delta T$ until $\Delta T$ is changed to include the full amount of the selected phase offset. For example, assume that phase stepper 154 has a threshold amount of 0.1 ns. If the selected phase offset were to be 0.1 ns or less, then phase stepper 154 allows signal offset controller 134 to change the value of $\Delta T$ by the selected phase offset. However, if the selected phase offset were to be 0.3 ns, then phase stepper 154 indicates that the value $\Delta T$ is to be altered in 0.1 ns increments, so that the next sample (in the next clock cycle) would be taken with a value of $\Delta T$ changed by 0.1 ns, the next sample (in the following clock cycle) would be taken with a value of $\Delta T$ changed by 0.2 ns, and the next sample (in yet the following clock cycle) would be taken with a value of $\Delta T$ change by 0.3 ns.

Phase stepper 154 also provides an indication to appropriate comparators when the stepping has been finished. This allows the appropriate comparisons to be made, such as by comparator 144. For example, comparator 144 can receive the indication and perform comparisons accordingly, so comparator 144 does not make a comparison of data values output from converter 140 and converter 142 until the phase stepping is finished.

In one or more embodiments, normal data samplers 104-110 are driving a clock output signal (referred to as the normal clock) that is different than the clock signal that is driven by eye monitor data sampler 112 (referred to as the eye monitor clock). The clock signal driven by normal data samplers 104-110 can arrive at comparator 144 at different times than the clock signal arriving at eye monitor data sampler 112 (e.g., due to different path delays and/or different initial phases of the clock signals), resulting in clock skew. To account for the clock skew, in one or more embodiments, a skew corrector is used to identify and correct for the clock skew. This correcting of clock skew is also referred to as calibration of the receiver. After identifying a delay to correct the clock skew, as discussed in more detail below, the signal offset controller 134 and/or a component providing timing signals 114-120 provide an appropriate delay to correct for the clock skew.

Figure 3:
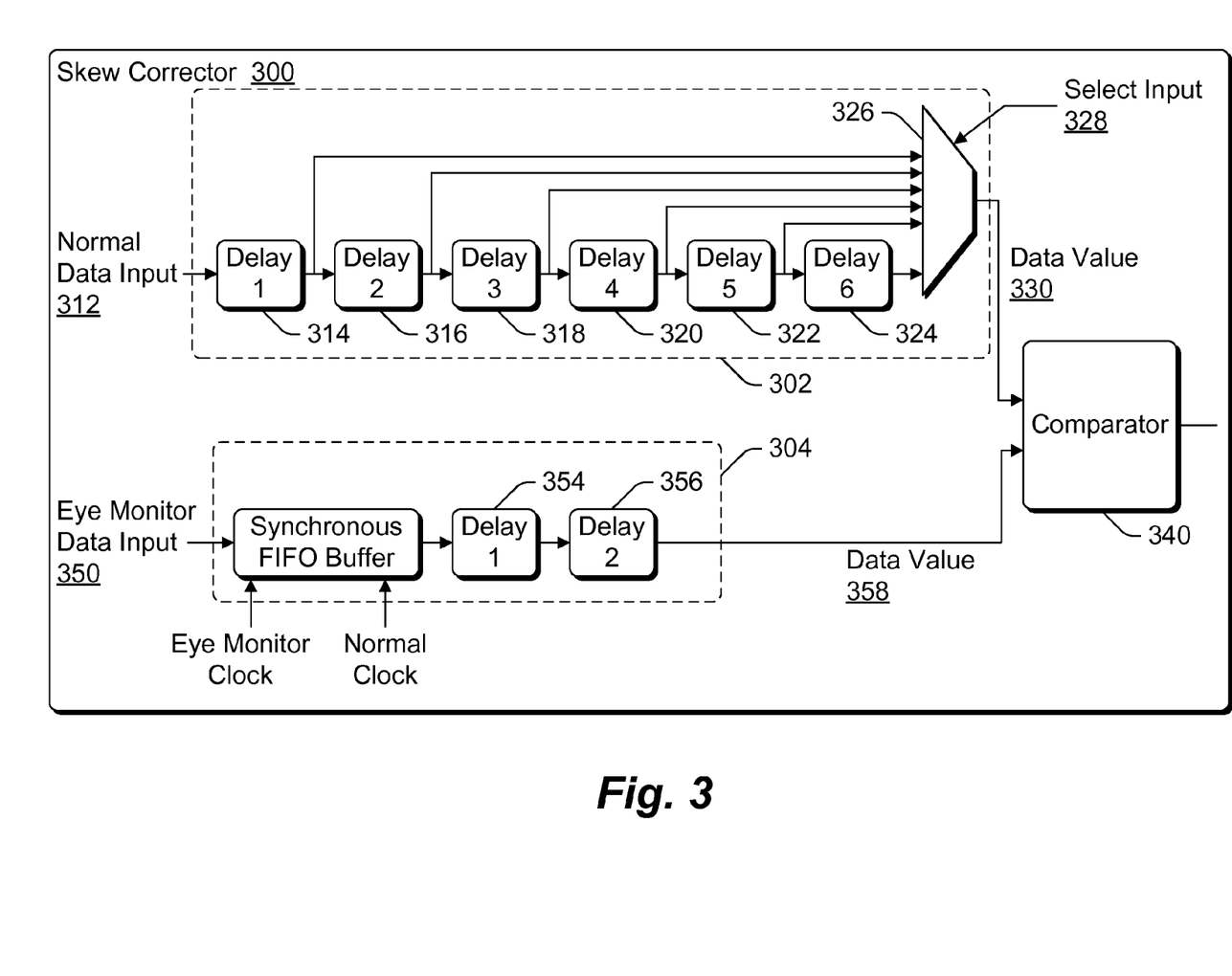
FIG. 3 is a block diagram illustrating a skew corrector in accordance with one or more embodiments.

FIG. 3 is a block diagram illustrating a skew corrector in accordance with one or more embodiments. Skew corrector 300 includes a normal data path 302 and an eye monitor data path 304. Normal data path 302 receives a normal data input 312, which includes the data values from the normal data samplers (e.g., normal data samplers 104, 106, 108, and 110 of FIG. 1). In embodiments in which each normal data sampler outputs a 5-bit data value, normal data input 312 is a 20-bit data value.

Normal data path 302 includes multiple delay registers 314, 316, 318, 320, 322, and 324. Although six delay registers are illustrated in normal data path 302, it is to be appreciated that less than six delay registers or greater than six delay registers can be included in normal data path 302. Each delay register 314-324 delays the normal data input 312 by a particular amount of time, and the data output of each delay register 314-324 is input to a multiplexor 326. Each delay register 314-324 can delay the normal data input 312 by the same amount of time, or alternatively different delay registers 314-324 can delay the normal data input 312 by different amounts of time. A select input 328 is also provided to multiplexor 326 to identify one of the six inputs to multiplexor 326 (one of the outputs from delay registers 314-324). The input to multiplexor 326 that is identified by select input 328 is output as data value 330 to a comparator 340. Thus, normal data path 302 allows the data values from the normal data samplers with different amounts of time delay to be selected and input to comparator 340.

Eye monitor data path 304 receives an eye monitor data input 350, which includes the data values received from the eye monitor data sampler (e.g., eye monitor data sampler 112 of FIG. 1). In embodiments in which the eye monitor data sampler outputs a 5-bit data value, eye monitor data input 350 is a 5-bit data value.

Eye monitor data path 304 includes a synchronous first-in, first-out (FIFO) buffer 352 and multiple delay registers 354 and 356. Although two delay registers are illustrated in eye monitor data path 304, it is to be appreciated that less than two delay registers or greater than two delay registers can be included in eye monitor data path 304. The data values received as eye monitor data input 350 are stored and output by synchronous FIFO buffer 352 in a first-in, first-out manner, and delayed by multiple delay registers 354 and 356. The output of delay register 356 is input as data value 358 to comparator 340.

Comparator 340 receives data value 330 from normal data path 302 and data value 358 from eye monitor data path 304, and compares the received data values. In one or more embodiments, data value 358 is a 5-bit data value while data value 330 is a 20-bit data value. Comparator 340 thus collects four data values 358 to compare to a single data value 330. In other embodiments, comparator 340 compares a data value 358 to a 5-bit portion of data value 330.

Comparator 340 compares data value 358 (individual 5-bit portions or four collected 5-bit portions) to multiple data values 330 identified by select input 328. The multiple data values 330 are the data values output from the delay registers 314-324. Comparator 340 can provide select input 328 to identify the data values output from one of the delay registers 314-324 that are to be output by multiplexor 326, or alternatively another component or module can provide select input 328. Comparator 340 compares data value 358 (individual 5-bit portions or four collected 5-bit portions) to the data values output from each of the six delay registers 314-324 and identifies whether the data value 358 matches the data value output from one of the delay registers 314-324. By comparing the data value 358 to the data values output from each of the six delay registers 314-324, comparator 340 can identify which of the delay registers 314-324 provides the correct delay to the normal clock for the normal data input 312 to correct for the clock skew.

In one or more embodiments, comparator 340 determines that the data value 358 matches the data value output from one of the delay registers 314-324 when the data value 358 is the same as the data value output from one of the delay registers 314-324. Alternatively, comparator 340 determines that the data value 358 matches the data value output from one of the delay registers 314-324 in other manners. For example, comparator 340 can determine that the data value 358 matches the data value output from one of the delay registers 314-324 having the data value output that is numerically closest to the data value 358.

In one or more embodiments, the data values received as normal data input 312 are in bit-order according to the order in which they are sampled by the normal data samplers. For example, referring to normal data samplers 104-110 of FIG. 1, the first of the 20 bits is sampled by normal data sampler 104, the second of the 20 bits is sampled by normal data sampler 106, the third of the 20 bits is sampled by normal data sampler 108, the fourth of the 20 bits is sampled by normal data sampler 110, the fifth of the 20 bits is sampled by normal data sampler 104, the sixth of the 20 bits is sampled by normal data sampler 106, and so forth. Accordingly, when comparator 340 compares the data value 330 to the data value 358, one comparison is of data value 358 to the bits sampled by normal data sampler 104 (bits 1, 5, 9, 13, and 17 of normal data input 312), a second comparison is of another data value 358 to the bits sampled by normal data sampler 106 (bits 2, 6, 10, 14, and 18 of normal data input 312), a third comparison is of yet another data value 358 to the bits sampled by normal data sampler 108 (bits 3, 7, 11, 16, and 19 of normal data input 312), and a fourth comparison is of still another data value 358 to the bits sampled by normal data sampler 110 (bits 4, 8, 12, 17, and 20 of normal data input 312).

Comparator 340 repeats the comparison of data value 358 (individual 5-bit portions or four collected 5-bit portions) to the data values output from each of the six delay registers 314-324 multiple times and maintains a record of how many times (and/or how frequently) each data value matches the data value output from each of the delay registers 314-324. Comparator 340 then identifies the delay register 314-324 that most frequently provides matched data values 330 and 358. Comparator 340 outputs an indication of this particular delay register 314-324 (or amount of delay) that provides the delay to the normal clock for the normal data input 312 to correct for the clock skew.

The number of times that comparator 340 repeats the comparison of data value 358 to the data values output from each of the delay registers 314-324 can be determined in a variety of different manners. In one or more embodiments, comparator 340 repeats the comparison until a threshold number of comparisons is satisfied. The threshold number of comparisons can be satisfied, for example, when at least a particular number of comparisons has been performed (e.g., at least one million comparisons have been performed) or after comparisons have been performed for at least a particular amount of time (e.g., at least two seconds). In other embodiments, comparator 340 also repeats the comparison until a threshold accuracy using a particular delay register 314-324 has been satisfied. The threshold accuracy can be satisfied, for example, when at least a particular percentage of comparisons using a particular delay register 314-324 have matched the data value 358 (e.g., at least 85% of the comparisons using a particular delay register 314-324 have matched the data value 358).

In the illustrated example of FIG. 3, multiple delay registers 314-324 are used in normal data path 302, one of which is selected as providing the correct delay to the normal clock for the normal data input 312 to correct for the clock skew as discussed above. Alternatively, the multiple delay registers can be implemented in eye monitor data path 304 rather than in normal data path 302. In such situations, skew corrector 300 operates similar to the discussion above, except comparator 340 identifies a particular delay register that provides the correct delay to the eye monitor clock for the eye monitor data input 350 to correct for the clock skew.

It should be noted that in the discussion of skew corrector 300, the normal data input 312 includes data outputs from all of the normal data samplers (e.g., normal data samplers 104-110 of FIG. 1). Alternatively, skew corrector 300 can use data from less than all of the normal data samplers (e.g., only three or only two of normal data samplers 104-110 of FIG. 1).

Figure 4:
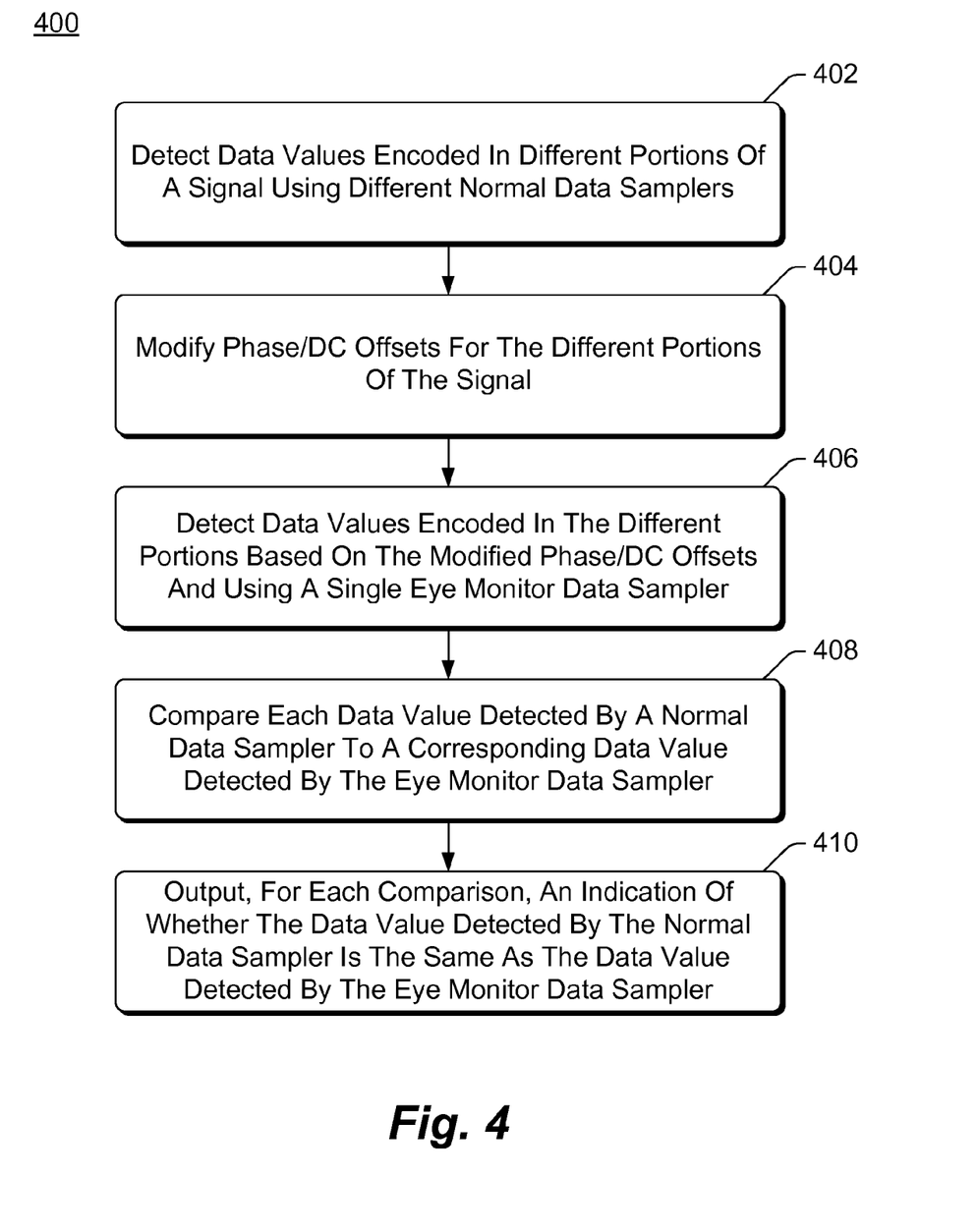
FIG. 4 is a flowchart illustrating a method for reducing eye monitor data samplers in a receiver in accordance with one or more embodiments.

FIG. 4 is a flowchart illustrating a method 400 for reducing eye monitor data samplers in a receiver in accordance with one or more embodiments. Aspects of method 400 may be implemented in hardware, firmware, software, or a combination thereof. Method 400 is described in the form of a set of operations to be performed, and the operations are not necessarily limited to the order shown.

At 402, different normal data samplers detect data values encoded in different portions of a signal. These different normal data samplers are, for example, normal data samplers 104-110 of FIG. 1 discussed above.

At 404, a phase offset controller applies the given phase offset to the eye monitor data sampler. This modifying of the phase offsets indicates a modified timing at which the sampling of the data encoded in the different portions of the signal is to occur. The phase offset controller can modify phase offsets in small amounts using a phase stepper as discussed above. Additionally, a DC controller applies the given DC offsets to the eye monitor data sampler.

At 406, a single eye monitor data sampler detects data values encoded in the different portions of the signal based on the modified phase/DC offsets. This eye monitor data sampler is, for example, eye monitor data sampler 112 of FIG. 1 discussed above.

At 408, a comparator compares each data value detected by a normal data sampler to a corresponding data value detected by the eye monitor data sampler. The corresponding data value detected by the eye monitor data sampler refers to the data value detected at the same time (e.g., t, t+T, t+2T, or t+3T) as one of the normal data samplers. As part of the comparison, the comparator determines whether the values being compared are the same.

At 410, the comparator outputs an indication, for each comparison, of whether the data value detected by the normal data sampler is the same as the data value detected by the eye monitor data sampler. These indications output by the comparator can be used to identify a valid eye that reflects the amount of DC offset and phase offset that a normal data sampler can tolerate while still accurately detecting data encoded in the signal received via the data input line as discussed above.

Method 400 is repeated one or more times to identify a valid eye, as discussed above. The number of times method 400 is repeated can vary. For example, method 400 can be repeated until comparisons have been made at 408 for at least a threshold number of different phase/DC offsets, until at least a threshold number of comparisons have been made at 408, until at least a threshold amount of time making the comparisons at 408 has passed, and so forth.

Figure 5:
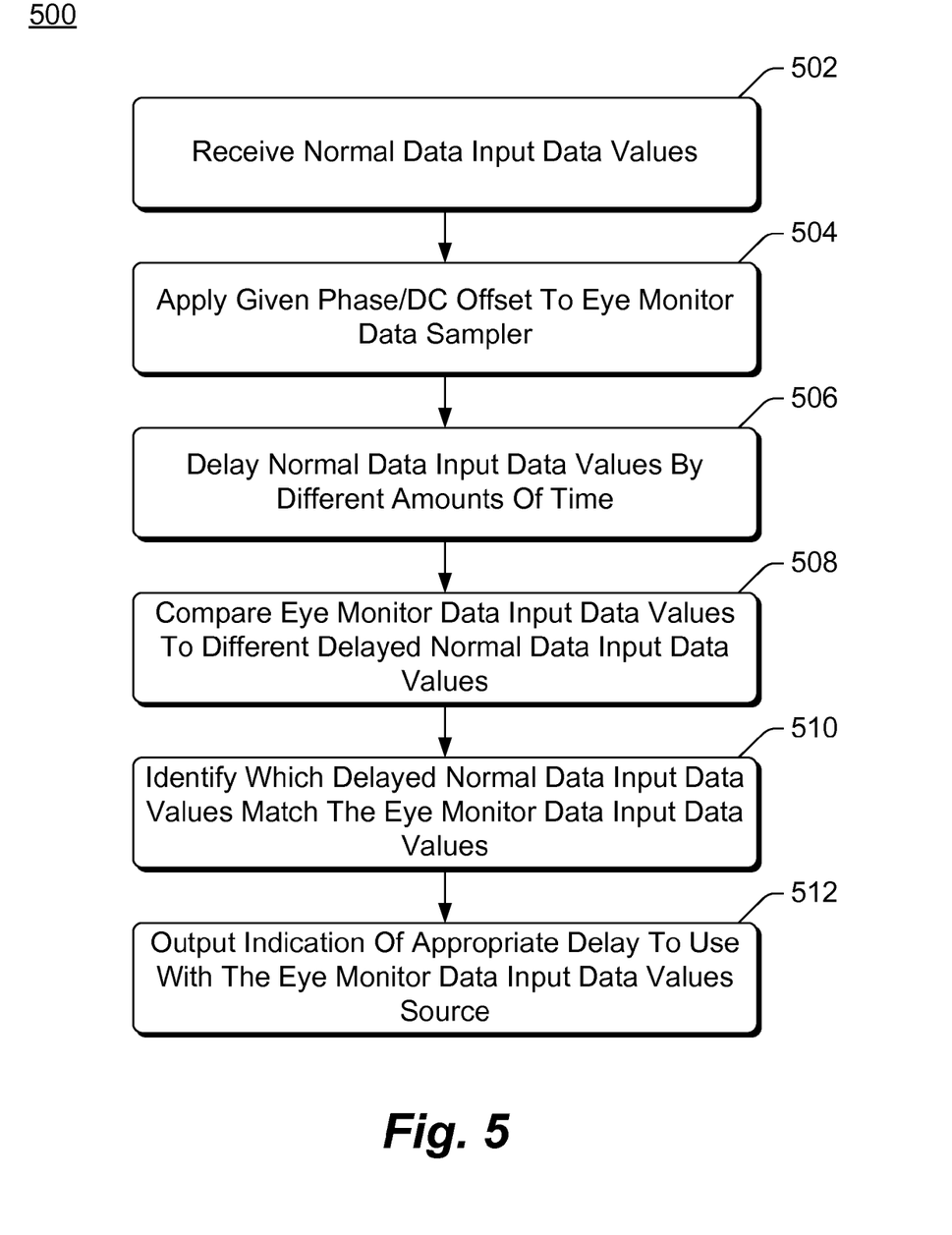
FIG. 5 is a flowchart illustrating a method for correcting clock skew in accordance with one or more embodiments.

FIG. 5 is a flowchart illustrating a method 500 for correcting clock skew in accordance with one or more embodiments. Aspects of method 500 may be implemented in hardware, firmware, software, or a combination thereof. Method 500 is described in the form of a set of operations to be performed, and the operations are not necessarily limited to the order shown.

At 502, a skew corrector receives normal data input data values. These data values are received from, for example, normal data samplers 104-110 of FIG. 1 discussed above.

At 504, the given phase/DC offset is applied to the eye monitor data sampler. The skew corrector receives eye monitor data input data values. These data values are received from, for example, eye monitor data sampler 112 of FIG. 1 discussed above.

At 506, delay registers delay the normal data input data values by different amounts of time. Different delay registers imposing different amounts of delay can be used at 506. Alternatively, a series of delay registers imposing the same amount of delay can be used as discussed above.

At 508, a comparator compares the eye monitor data input data values to different delayed normal data input data values.

At 510, based on the comparison at 508, the comparator identifies which delayed normal data input data values match the eye monitor data input data values. Which delayed normal data input data values match the eye monitor data input data values can be determined in different manners as discussed above.

At 512, an indication of an appropriate delay to use to correct clock skew is output. The appropriate delay is the delay imposed by the delay register for which the comparator identified the delayed normal data input data values as matching the eye monitor data input data values. The appropriate delay can be imposed on the normal clock driving the normal data samplers, and/or the eye monitor clock driving the eye monitor data sampler as discussed above.

Figure 6:
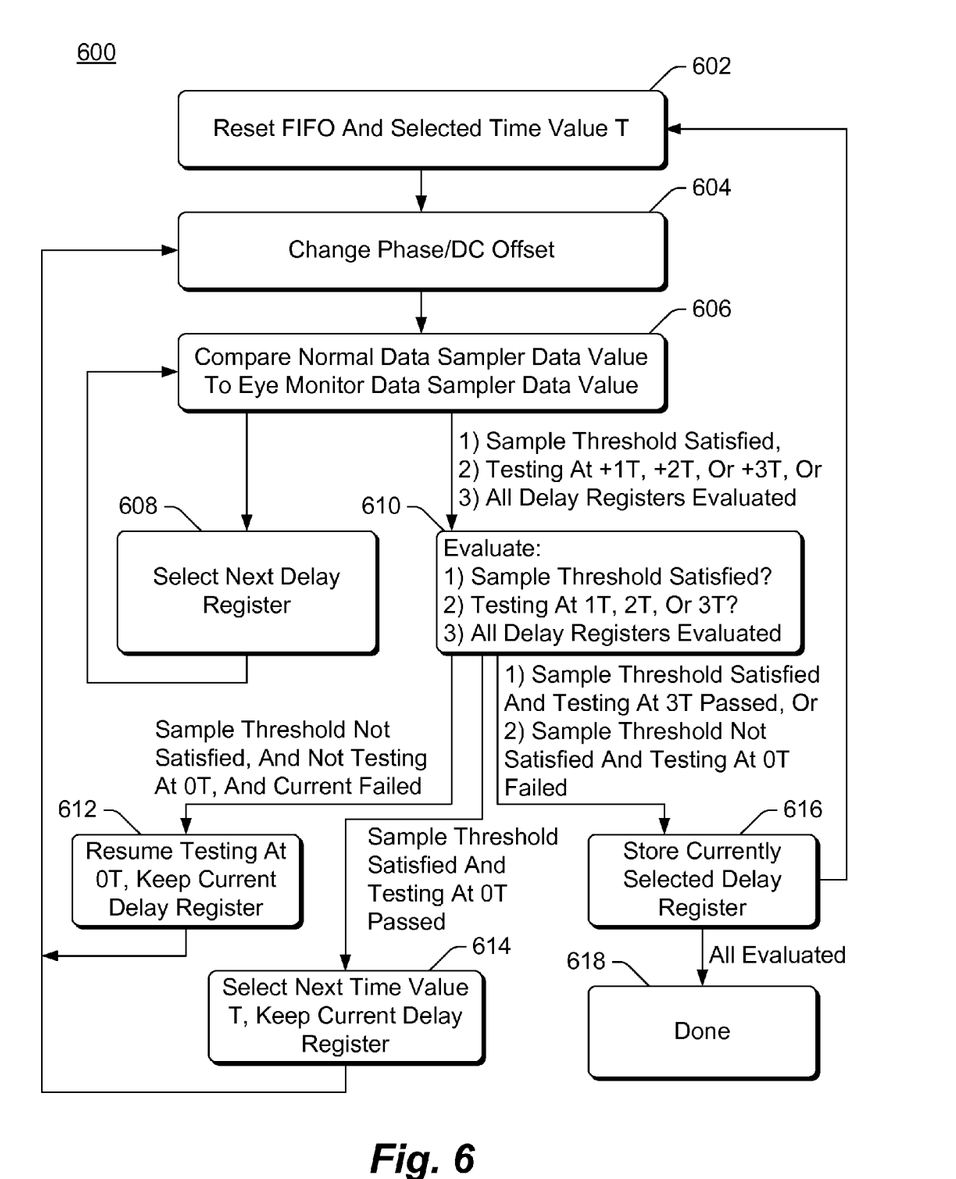
FIG. 6 is a flowchart illustrating another method for correcting clock skew in accordance with one or more embodiments.

FIG. 6 is a flowchart illustrating another method 600 for correcting clock skew in accordance with one or more embodiments. Aspects of method 600 may be implemented in hardware, firmware, software, or a combination thereof. Method 600 is described in the form of a set of operations to be performed, and the operations are not necessarily limited to the order shown. Method 600 is discussed with additional reference to elements of FIG. 3.

At 602, the synchronous FIFO 352 is reset, and comparator 340 resets the particular time value T to 0T. At 602, comparator 340 can also select a particular delay register 314-324, such as delay register 314. The time value T can be 0T, 1T, 2T, or 3T, referring to the particular times t, t+T, t+2T, and t+3T at which normal data samplers 104-110 of FIG. 1 sample data. Accordingly, the time value T can also be viewed as referring to data from a particular one of normal data samplers 104-110.

At 604, the phase stepper steps to the correct offset for the selected time value T as appropriate. The phase stepper, as discussed above, enforces phase changes of not greater than a threshold amount between clock cycles. Method 600 proceeds to 606 after the offset for the selected time value T has been stepped to. Meanwhile, the DC controller changes the DC offset to the given value.

At 606, comparator 340 compares the normal data sampler data value to the corresponding eye monitor data sampler data value. The normal data sampler data value is for the selected time value T (which has been initially reset to 0T).

Method 600 then proceeds based on one or more of whether the sample threshold is satisfied, the current selected time value T, and whether all delay registers have been evaluated for the current selected time value T. The sample threshold can be satisfied in different manners as discussed above with reference to the number of times comparator repeats its comparison, such as if at least a threshold number of normal data sampler data values have been compared to the corresponding eye monitor data sampler data values for the current selected time value T.

Method 600 proceeds to 608 if the comparator 340 determines at 606 that the normal data sampler data value does not match the corresponding eye monitor data sampler data value. Comparator 340 can determine that the normal data sampler data value does not match the corresponding eye monitor data sampler data value in different manners, such as if the normal data sampler data value and the corresponding eye monitor data sampler data value are not the same, if the numerical difference between the normal data sampler data value and the corresponding eye monitor data sampler data value is at least a threshold amount, and so forth.

Method 600 also proceeds to 608 if the sample threshold is not satisfied, the selected time value is 0T, and all the delay registers 314-324 have not been evaluated for the current selected time value T. At 608, comparator 340 selects the next delay register 314-324. Comparator 340 can select delay registers 314-324 in their order of delay (e.g., delay register 314, then delay register 316, then delay register 318, and so forth), or alternatively in other orders.

Method 600 proceeds to 610 if the sample threshold is satisfied, or if the current selected time value is not 0T (i.e., is one of 1T, 2T, or 3T), or if all the delay registers have been evaluated for the current selected time value T. At 610, method 600 proceeds based on an evaluation (e.g., by comparator 340) of whether the sample threshold is satisfied, the current selected time value T, and whether all the delay registers have been evaluated for the current selected time value T. Method 600 proceeds to one of 612, 614, or 616 based on the results of this evaluation.

Method 600 proceeds to 612 if the sample threshold is not satisfied, the current selected time value is not 0T, and the current comparison at 606 passed. The current comparison from 606 passed if the comparator 340 determined at 606 that the normal data sampler data value matches the corresponding eye monitor data sampler data value. At 612, selected time value is reset to 0T, the currently selected delay register remains selected, and method 600 returns to 604.

Method 600 proceeds to 614 if the sample threshold is satisfied, the current selected time value is not 0T, and the current comparison from 606 passed. At 614, the next time value T is selected, the currently selected delay register remains selected, and method 600 returns to act 604. The time values can be selected in their timing order (e.g., 0T, then 1T, then 2T, then 3T), or alternatively can be selected in other orders.

Method 600 proceeds to 616 if the sample threshold is satisfied, the current selected time value is 3T, and the current comparison from 606 passed. Method 600 also proceeds to 616 if the sample threshold is not satisfied, the current selected time value is 0T, and the current comparison from 606 failed. At 616, an indication of the currently selected delay register is stored as an indication of a delay register that passed (e.g., for which the comparator 340 determined at 606 that the normal data sampler data value matches the corresponding eye monitor data sampler data value).

Method 600 proceeds to 618 if comparator 340 determines that method 600 has been repeated a sufficient number of times. This sufficient number of times can be determined in different manners as discussed above, such as when a threshold number of comparisons has been performed. At 618, the clock skew correction method is done. The correct delay to the normal data input 312 to correct for the clock skew is identified based on the indicated delay registers stored at 616 (e.g., the delay register stored most frequently at 616 provides the correct delay to correct for the clock skew). Method 600 proceeds to 602 if comparator 340 determines that method 600 has not been repeated a sufficient number of times.

In one or more embodiments, a clock skew correction method is performed as discussed above. After the clock skew correction method has been performed, phase offsets/DC can be changed to identify valid eyes for the normal data samplers. Alternatively, the clock skew correction method can be performed concurrently with changing the phase offsets for identifying the valid eye for the normal data samplers.

In performing the clock skew correction and the phase offset changing concurrently, a comparator (e.g., comparator 340 of FIG. 3) selects or otherwise obtains a particular phase offset. The eye monitor data input data values for the particular phase offset are compared to the normal data input data values as delayed by each of the multiple delay registers 314-324. Accordingly, six comparisons (one for each of the multiple delay registers 314-324) are performed between a particular normal data input data value and a corresponding eye monitor data input value. An indication of an amount of error for each comparison is maintained by the comparator. This indication of an amount of error can take a variety of different forms, such as a difference between the particular delayed normal data input data value and the corresponding eye monitor data input value being compared. These comparisons are repeated multiple times for different sampled data (e.g., for one million eye monitor data input values). After the comparisons are repeated a sufficient number of times, the comparisons corresponding to the one of delay registers 314-324 having the smallest amount of error is selected as the appropriate delay register to use (or the appropriate amount of delay to use) to correct clock skew.

Figure 7:
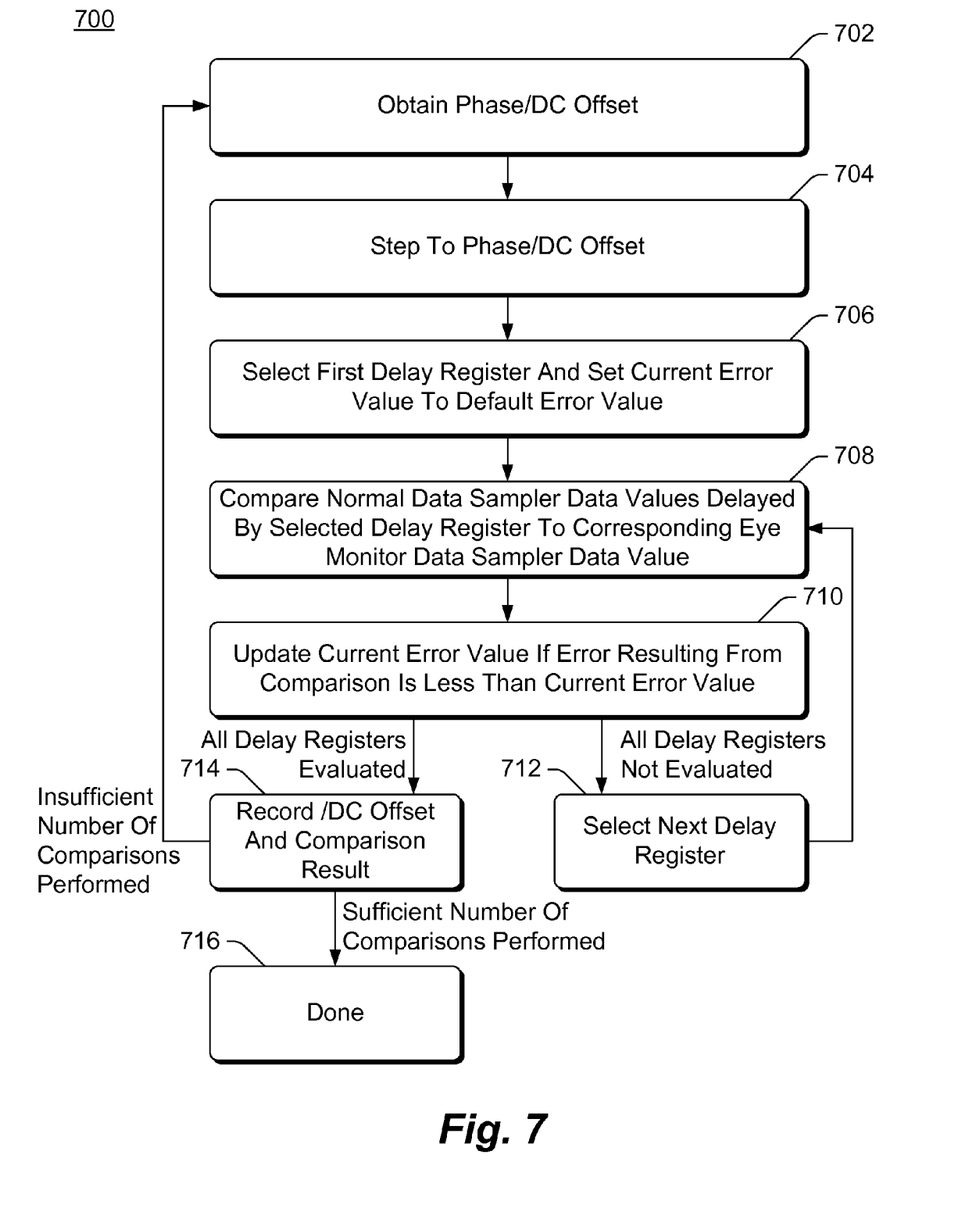
FIG. 7 is a flowchart illustrating a method for performing clock skew correction and phase/DC offset changing concurrently in accordance with one or more embodiments.

FIG. 7 is a flowchart illustrating a method 700 for performing clock skew correction and phase offset changing concurrently in accordance with one or more embodiments. Aspects of method 700 may be implemented in hardware, firmware, software, or a combination thereof. Method 700 is described in the form of a set of operations to be performed, and the operations are not necessarily limited to the order shown.

At 702, a comparator obtains a phase/DC offset. The phase/DC offset is used for identifying the valid eyes for the normal data samplers as discussed above. The comparator can be, for example, comparator 340 of FIG. 3. The phase/DC offset can be obtained from a variety of different sources, such as a component or module identifying the valid eyes. Alternatively, the comparator can generate the phase/DC offset.

At 704, a phase stepper steps to the correct offset for the selected phase offset as appropriate. The phase stepper, as discussed above, enforces phase changes of not greater than a threshold amount between clock cycles. A DC controller changes the DC offset for the selected DC offset. Method 700 proceeds to 706 after the phase offset has been stepped to.

At 706, the comparator selects a first delay register and sets a current error value to a default error value. The comparator can select delay registers (e.g., delay registers 314-324 of FIG. 1) in their order of delay (e.g., delay register 314, then delay register 316, then delay register 318, and so forth), or alternatively in other orders. Each delay register has a corresponding current error value (e.g., stored in an error register). The current error value refers to the amount of error between a particular normal data input data value and a corresponding eye monitor data input value. The default error value is, for example, a largest or maximum error value that can be identified.

At 708, the comparator compares the normal data sampler data values, as delayed by the selected delay register, to the corresponding eye monitor data sampler data value. The data values from each of the normal data samplers (e.g., normal data samplers 104-110 of FIG. 1) are compared to the corresponding eye monitor data sampler data value. Accordingly, the data values corresponding to times t, t+T, t+2T, and t+3T are compared at 708. Additionally, at 708 an indication of an error between each data value and the corresponding eye monitor data input value is identified.

At 710, for each comparison performed at 708, the current error value corresponding to the selected delay register is updated to be the amount of error resulting from the comparison if the amount of error resulting from the comparison is less than the current error value.

Method 700 then proceeds based on whether all the delay registers have been evaluated (e.g., comparisons of the current normal data sampler data values and eye monitor data sampler data value based on outputs from all six delay registers have been performed at 706). If all the delay registers have not been evaluated, then method 700 proceeds to 712. At 712, the next delay register is selected, and method 700 returns to 708. If all the delay registers have been evaluated, then method 700 proceeds to 714.

At 714, the phase/DC offset obtained at 702 and the result of the comparison at 708 is recorded. The result of the comparison at 708 that is recorded is the comparison for which the selected delay register having the smallest error value (e.g., the current error value after all six delay registers have been evaluated) and an indication of which delay register provided the smallest error value. This recording of the phase/DC offset and result of comparing the normal data sampler data values, as delayed by the selected delay register, to the corresponding eye monitor data sampler data value can be used to identify the valid eyes for the normal data samplers as discussed above.

Method 700 then proceeds based on whether a sufficient number of comparisons have been performed. If a sufficient number of comparisons have not been performed, then method 700 returns to 702. At 702 a different phase/DC offset can be obtained for additional comparisons, or alternatively the same phase/DC offset can be maintained.

If a sufficient number of comparisons have been performed, then method 700 proceeds to 716. At 716, the clock skew correction and phase/DC offset changing method is done. The correct delay to the normal data input (e.g., normal data input 312 of FIG. 3) to correct for the clock skew is identified based on the results recorded at 714 (e.g., the delay register having the smallest error value across all comparisons provides the correct delay to correct for the clock skew).

Figure 8:
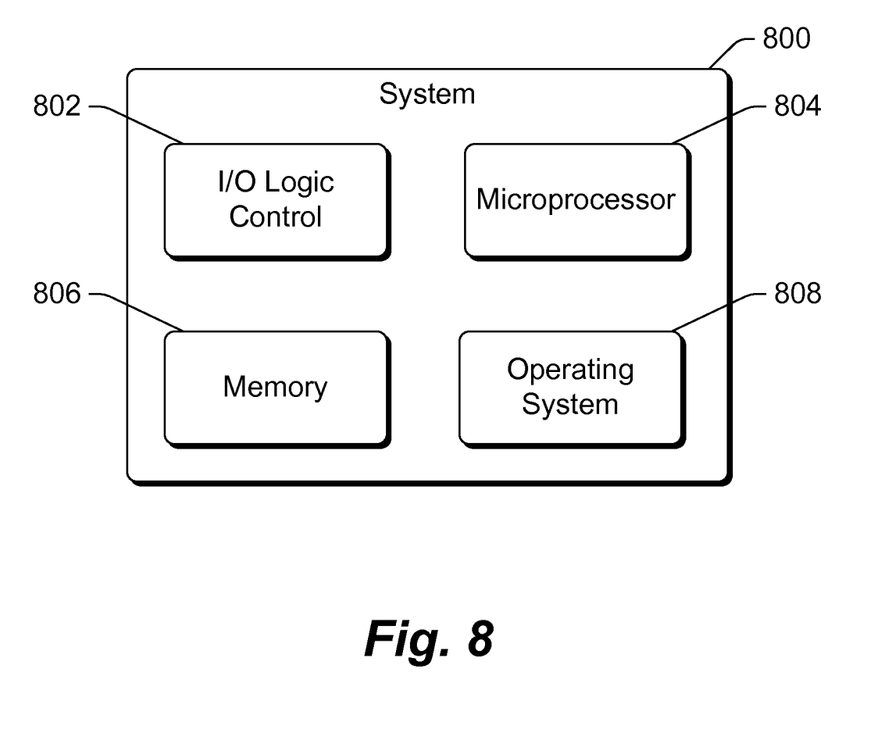
FIG. 8 illustrates an example system that can implement various embodiments described herein.

FIG. 8 illustrates an example system 800 that can implement various embodiments described herein. System 800 can be implemented in a variety of different fixed or mobile devices, such as one or a combination of a media device, computer device, television set-top box, video processing and/or rendering device, appliance device, gaming device, electronic device, vehicle, workstation, and/or in any other type of computing device. System 800 can be implemented as a System-on-Chip (SoC).

System 800 can be integrated with electronic circuitry, a microprocessor, memory, input-output (I/O) logic control, communication interfaces and components, other hardware, firmware, and/or software to run a device, and so forth. System 800 can also include an integrated data bus (not shown) that couples the various components of the system for data communication between the components. A device that includes system 800 can also be implemented with many combinations of differing components.

In this example, system 800 includes various components such as an input-output (I/O) logic control 802 (e.g., to include electronic circuitry) and a microprocessor 804 (any of a microcontroller, central processing unit (CPU), digital signal processor, etc.). System 800 also includes a memory 806, which can be any type of random access memory (RAM), a low-latency nonvolatile memory (e.g., flash memory), read only memory (ROM), and/or other suitable electronic data storage. System 800 can also include various firmware and/or software, such as an operating system 808, which can be computer-executable instructions maintained by memory 806 and executed by microprocessor 804. System 800 can also include other various communication interfaces and components, wireless LAN (WLAN) or PAN (WPAN) components, other hardware, firmware, and/or software.

System 800 can implement a receiver, such as receiver 100 of FIG. 1. Examples of a receiver and its functionality are described above. Alternatively, system 100 can include an additional receiver component or device (not shown in FIG. 8) that is a receiver 100 of FIG. 1.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
    selecting, from a plurality of delay registers corresponding to a plurality of respective delay time values, a selected delay time value, the plurality of respective delay time values previously used to correct a previous clock skew for sampling a previous signal received on a data input line;
    sampling, using a normal data sampler, a first value from a portion of a signal received on the data input line;
    sampling, using an eye monitor data sampler, a second value from the portion of the signal, the sampling of the second value based on a modified phase offset used to correct a clock skew, the modified phase offset corresponding to the selected delay time value;
    comparing the first value and the second value to determine if the first value and the second value match;
    responsive to determining that the first value and the second value match, storing an indication of the delay register from which the selected delay time value was selected, the indication identifying that the selected delay time value is to be used in setting a phase offset effective to correct the clock skew for sampling the signal.

2. The method of claim 1, further comprising:
    enforcing a limit on an amount of phase change to the phase offset between clock cycles.

3. The method of claim 1, wherein comparing the first value and the second value is performed for all of the respective delay time values.

4. The method of claim 3, wherein comparing the first value and the second value is performed in order of delay of each of the respective delay time values.

5. The method of claim 3, wherein comparing the first value and the second value for all of the respective delay time values is performed for multiple time values at which the normal sampler samples the signal.

6. The method of claim 1, wherein comparing finds the match if a difference between the first value and the second value is less than a threshold amount.

7. The method of claim 1, wherein comparing of the first value and the second value is performed at least a threshold number of times of times for each of the respective delay time value.

8. The method of claim 1, further comprising:
    changing the phase offset for the normal data sampler by the selected delay.

9. A system comprising:
    a plurality of delay registers corresponding to a plurality of respective delay time values, the plurality of respective delay time values previously used to correct a previous clock skew for sampling a previous signal received on a data input line;
    a normal data sampler configured to receive a signal via a data input line and sample a first data value from a portion of the signal;
    an eye monitor data sampler configured to sample a second data value from the portion of the signal, the sampling of the second value based on a modified phase offset used to correct a clock skew, the modified phase offset corresponding to a delay time value selected from the plurality of delay registers;

a signal offset controller configured to control delay for the sampling of the second value by the eye monitor data sampler based on the delay time value selected from the plurality of delay time values; and a comparator configured to determine if the first value and the second value match, and in response to a determination that the first value and the second value match, store an indication of the delay register from which the selected delay time value was selected, the identifying that the selected delay time value is to be used in setting the phase offset effective to correct the clock skew for sampling the signal.

10. The system of claim 9, further comprising:

a phase stepper configured to change the phase offset for the eye data sampler.

11. The system of claim 10, wherein the phase stepper is configured to enforce a limit on the amount of phase change to the phase offset between clock cycles.

12. The system of claim 9, wherein the comparator is further configured to compare the first value and the second value for all of the delay time values in the plurality of delay registers.

13. The system of claim 12, wherein the comparator is further configured to compare the first value and the second value for all of the plurality of delay time values, each delay register of the plurality of delay registers selected in order of delay.

14. The system of claim 12, wherein the comparator is further configured to compare the first value and the second value for all of the delay time values for multiple time values at which the normal sampler samples the signal.

15. The system of claim 9, wherein the comparator is configured to find the match if a difference between the first value and the second value is less than a threshold amount.

16. The system of claim 9, wherein the comparator is further configured to compare the first value and the second value at least a threshold number of times of times for each delay time value.

17. A system comprising:

multiple normal data samplers configured to receive a signal via a data input line and sample data values encoded in different portions of a signal;

a signal offset controller configured to modify phase or DC offsets for a single eye monitor data sampler;

the eye monitor data sampler configured to sample data values encoded in the different portions of the signal based on the modified phase or DC offsets;

a skew corrector configured to identify a delay to correct for clock skew between an eye monitor clock driven by the single eye monitor data sampler and a normal clock driven by the multiple normal data samplers;

a comparator configured to:
  compare each data value sampled by the multiple normal data samplers to a corresponding data value sampled by the single eye monitor data sampler using the delay; and
  output, for each comparison, an indication of whether the data value sampled by each of the multiple normal data samplers matches the corresponding data value sampled by the single eye monitor data sampler.

18. The system of claim 17, the skew corrector further configured to identify an amount of the delay concurrently with changing phase or DC offsets to identify valid eyes indicating amounts of phase or DC offsets that the multiple normal data samplers are able to tolerate while accurately sampling data values encoded in the signal.

19. The system of claim 17, the skew corrector further configured to identify an amount of the delay by comparing multiple data values sampled by the single eye monitor data sampler to multiple data values sampled by the multiple normal data samplers, the multiple data values having been delayed by different amounts of time.

20. The system of claim 17, wherein the multiple normal data samplers comprise four normal data samplers, and wherein each of the four normal data samplers samples data encoded in one of four different channels on the data input line via which the signal is received.

* * * * *